United States Patent
Lai et al.

(10) Patent No.: US 6,381,816 B1
(45) Date of Patent: May 7, 2002

(54) FABRIC STRAP RETAINER

(75) Inventors: Chin-Kuo Lai; Yun-Mei Hsieh; Pin-Heng Liao, all of Taoyuan Hsien (TW)

(73) Assignee: Taiwan Industrial Fastener Corporation, Taipei (TW)

( * ) Notice: Subject to any disclaimer, the term of this patent is extended or adjusted under 35 U.S.C. 154(b) by 0 days.

(21) Appl. No.: 09/641,569

(22) Filed: Aug. 18, 2000

(30) Foreign Application Priority Data

Nov. 30, 1999 (TW) ........................................ 88120849 A

(51) Int. Cl.[7] ............................. F16G 11/00; A43C 7/00
(52) U.S. Cl. ........................ 24/712.9; 24/712.1; 24/130
(58) Field of Search .......................... 24/712.1, 712.2, 24/712.7, 713.6, 712.9, 130, 122.6, 115 A; 36/50.1

(56) References Cited

U.S. PATENT DOCUMENTS

| | | | | |
|---|---|---|---|---|
| 4,649,664 A | * | 3/1987 | Mahan ...................... 24/130 X |
| 4,878,269 A | * | 11/1989 | Anscher et al. ......... 24/712.5 X |
| 5,903,959 A | * | 5/1999 | Leonardi .................... 24/712.1 |
| 5,987,711 A | * | 11/1999 | Parsons ........................ 24/130 |
| 6,185,798 B1 | * | 2/2001 | Ton ............................ 24/712.1 |

* cited by examiner

Primary Examiner—Robert J. Sandy
(74) Attorney, Agent, or Firm—Rabin & Berdo, P.C.

(57) ABSTRACT

A fabric strap retainer having a back insertion hole at a back side thereof for the insertion of two fabric straps in a crossed manner, two post-like stop ends at two sides of the back insertion hole, a partition column disposed on the middle in flush with a front side thereof, two release holes respectively extended from the back insertion hole to the periphery thereof at two sides of the partition column, two hollow engagement units respectively forwardly extended from the release holes to the periphery thereof at two sides of the partition column, the hollow engagement units each having two series of teeth respectively disposed at top and bottom sides thereof.

15 Claims, 10 Drawing Sheets

FABRIC STRAP RETAINER

BACKGROUND OF THE INVENTION

The present invention relates to a fabric strap retainer, and more particularly to a fabric strap retainer that has two engagement units and two release holes for receiving inserted fabric straps between a locking position and an unlocking position.

Fabric straps are extensively used in shoes, bags, and any of a variety of personal articles for securing two parts together. When a fabric strap is inserted through the eyelets on two flaps of a shoe, the two distal ends of the fabric strap are tied up to secure the flaps together. However the fabric strap may be loosened easily during activity of the user.

Further, FIG. 12 shows a cord member guide block for use with a shoe or the like according to Taiwan patent publication no. 279324, filed on Jan. 28, 1995 by the present inventor. This cord member guide block comprises a body A, and a roller B. The body A comprises a receiving unit A1 adapted to receive a fabric cord or strap, and a mounting unit A2 integral with the periphery of the receiving unit A1 and adapted for mounting. The roller B is rotated in the receiving unit A1, and adapted to guide movement of the fabric cord or strap inserted through the receiving unit A1. This cord member guide block cannot lock the inserted fabric cord or strap in position.

FIG. 13 shows a fabric cord member (strap) retainer according to Taiwan Patent Publication No. 369821, which is also an invention of the present inventor. This fabric cord member (strap) retainer comprises a body C, which comprises a casing C1 and a cord member (strap) receiving unit C2, a locking lever F pivoted to the body C, and a torsional spring E installed in the body C and connected between the locking lever F and the casing C1. The locking lever F has a finger strip F1 at one end, and a toothed portion F2 at an opposite end. When assembled, the locking lever F is turned between the locking position where the inserted cord members or straps are closed, and the unlocking position where the inserted cord members or straps are unlocked and can be moved relative to the casing C1. This fabric cord member retainer is functional. However because this fabric cord member (strap) retainer is comprised of a number of parts, its fabrication cost is high.

SUMMARY OF THE INVENTION

The invention has been accomplished under the circumstances in view. It is one object of the present invention to provide a fabric strap retainer, which is inexpensive to manufacture. It is another object of the present invention to provide a fabric strap retainer, which is practical. According to one aspect of the present invention, the fabric strap retainer comprises a back insertion hole at a back side thereof for the insertion of two fabric straps in a crossed manner, two post-like stop ends at two sides of the back insertion hole, a partition column disposed on the middle in flush with a front side thereof, two release holes respectively extended from the back insertion hole to the periphery thereof at two sides of the partition column, two hollow engagement units respectively forwardly extended from the release holes to the periphery thereof at two sides of the partition column, wherein the hollow engagement units each have two series of teeth respectively disposed at top and bottom sides thereof. According to another aspect of the present invention, the fabric strap retainer is injection-molded from plastics.

DETAILED DESCRIPTION OF THE PREFERRED EMBODIMENT

Figure 1:
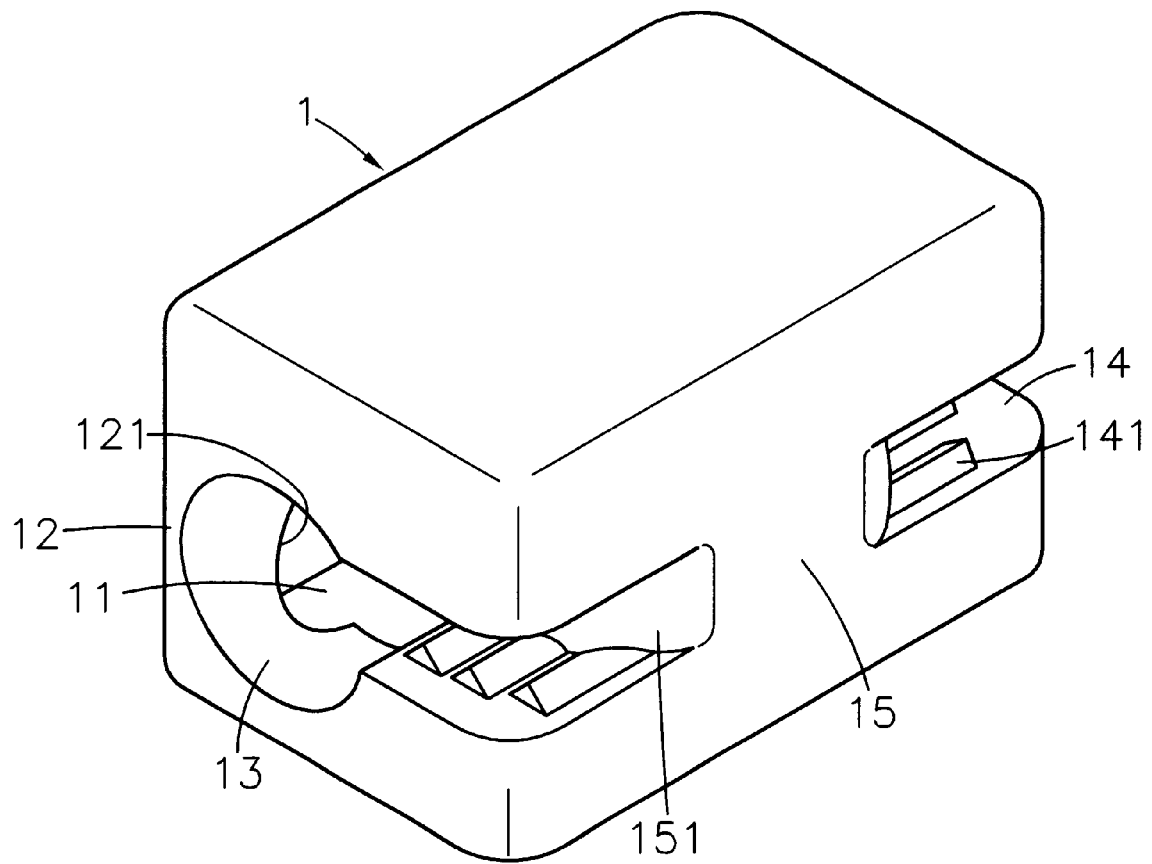
FIG. 1 is a perspective view of a fabric strap retainer according to the present invention.
Figure 2:
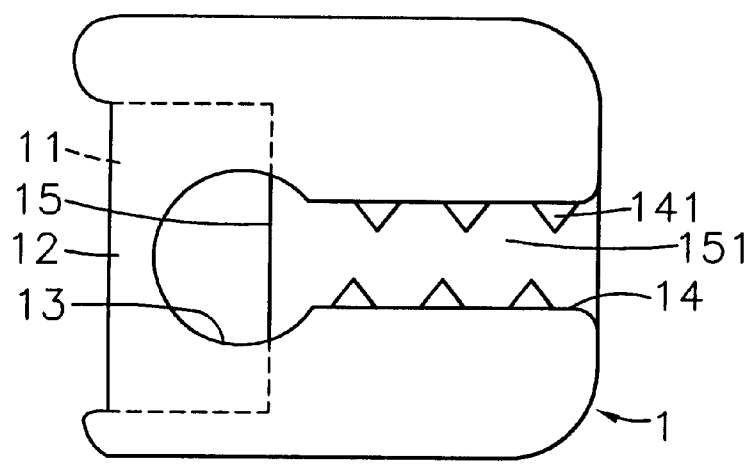
FIG. 2 is a side plain view of the fabric strap retainer shown in FIG. 1.
Figure 3:
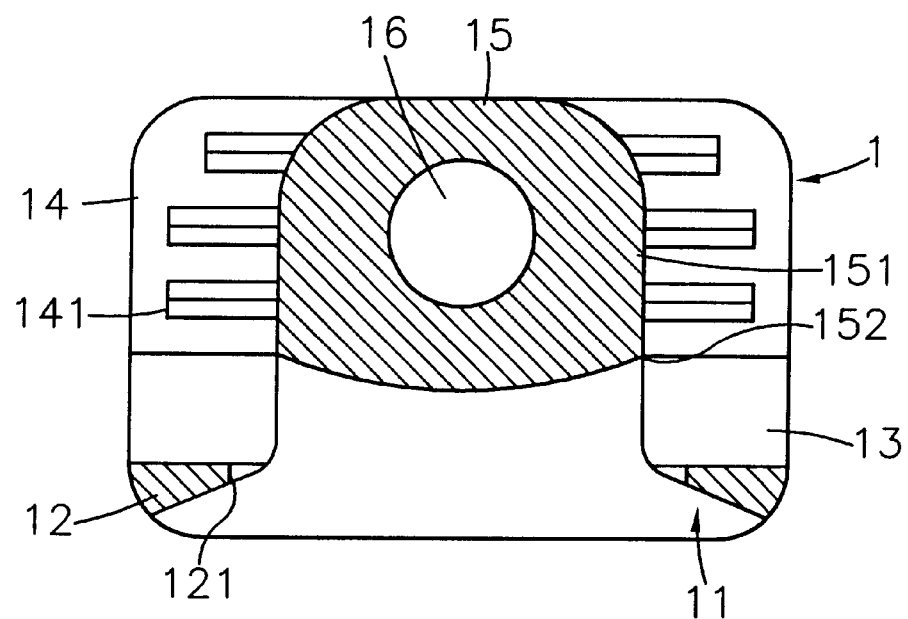
FIG. 3 is a top view in section of the fabric strap retainer shown in FIG. 1.

Referring to FIGS. from 1 through 3, a fabric strap retainer 1 is a rectangular member directly molded from plastics. The retainer 1 has a back insertion hole 11 at the back side thereof. Two post-like stop ends 12 are disposed at two sides of the back insertion hole 11. Two release holes 13 respectively extended through two opposite lateral sides of the retainer 1 and are in communication with the back insertion hole 11. Two hollow engagement units 14 respectively forwardly extend from the release holes 13 to the front side of the retainer 1. A partition column 15 is disposed on the middle between the engagement units 14 and in flush with the front side of the retainer 1. A locating hole 16 is at the back side of the partition column 15. The post-like stop ends 12 each have an arched bearing face 121 at an inner side. The width of the hollow engagement units 14 is relatively smaller than the diameter of the release holes 13. The engagement units 14 each comprise two series of teeth 141 respectively disposed at top and bottom sides and which extend in a direction from the release holes 13 toward the front side of the fabric strap retainer 1. The partition column 15 has two side walls 151 respective facing the engagement units 14 terminating in a respective back turn 152.

Figure 4:
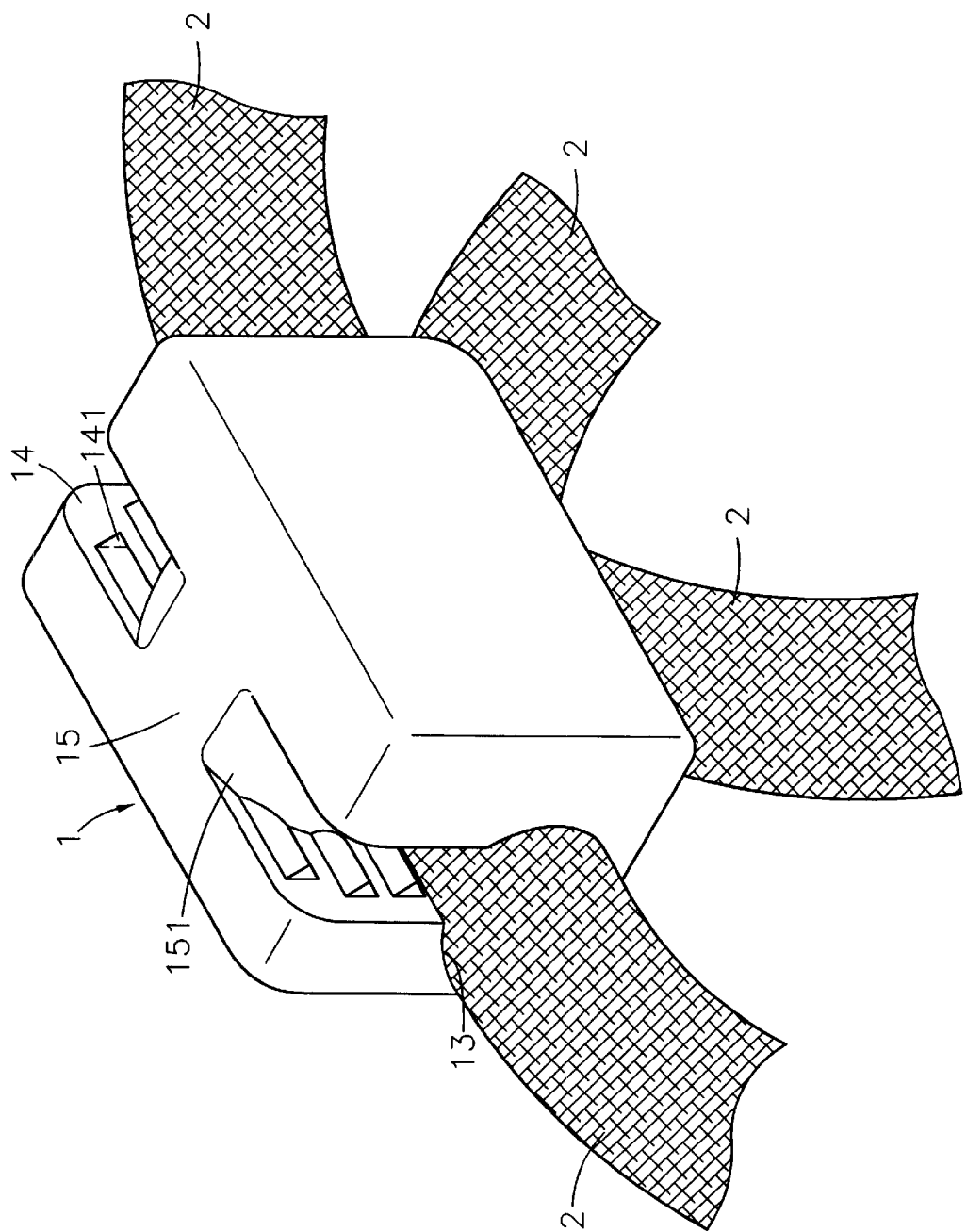
FIG. 4 illustrates fabric straps inserted through the back insertion hole and the release holes according to the present invention.
Figure 5:
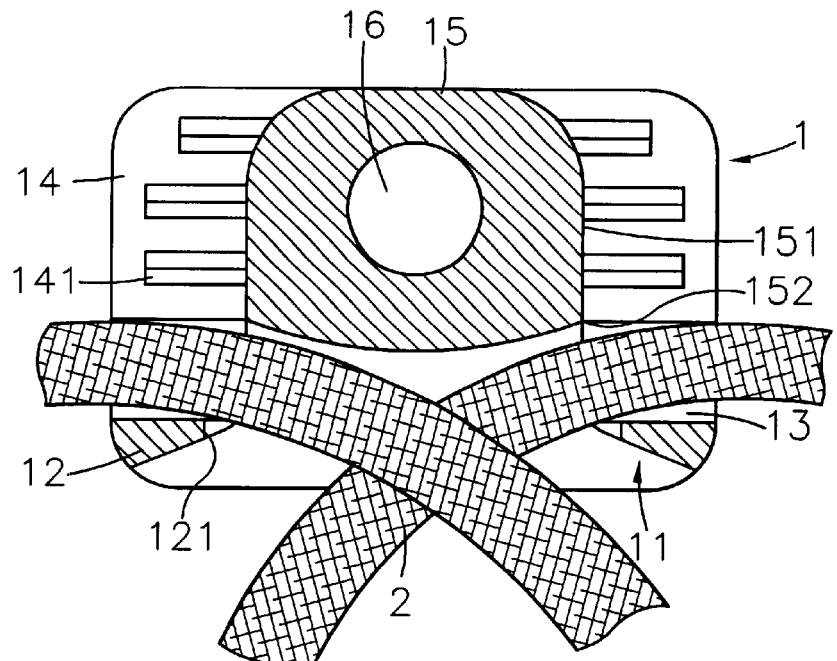
FIG. 5 is a top view in section of FIG. 4.
Figure 7:
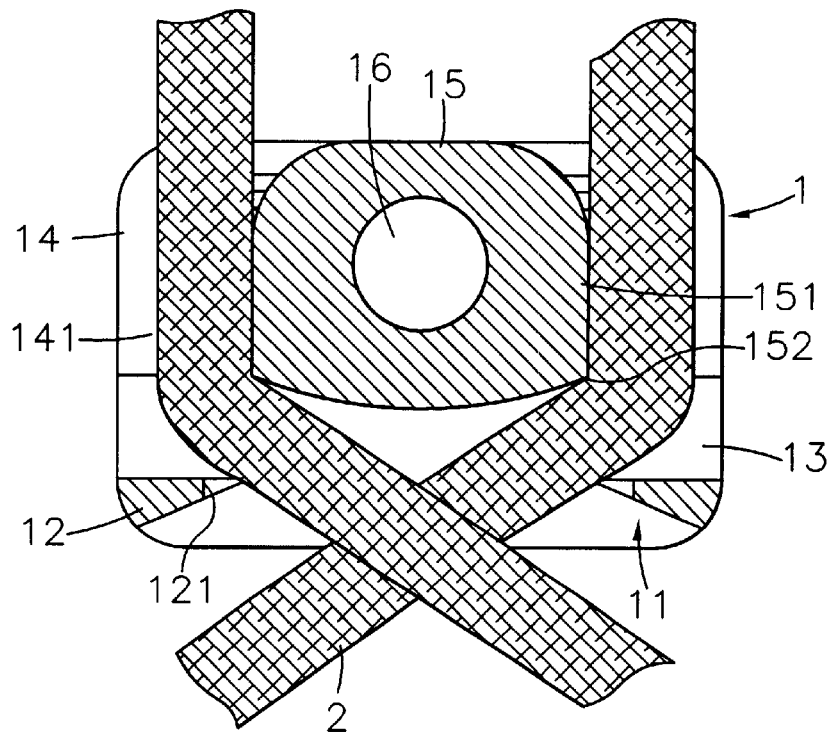
FIG. 7 is a top view in section of FIG. 6.
Figure 6:
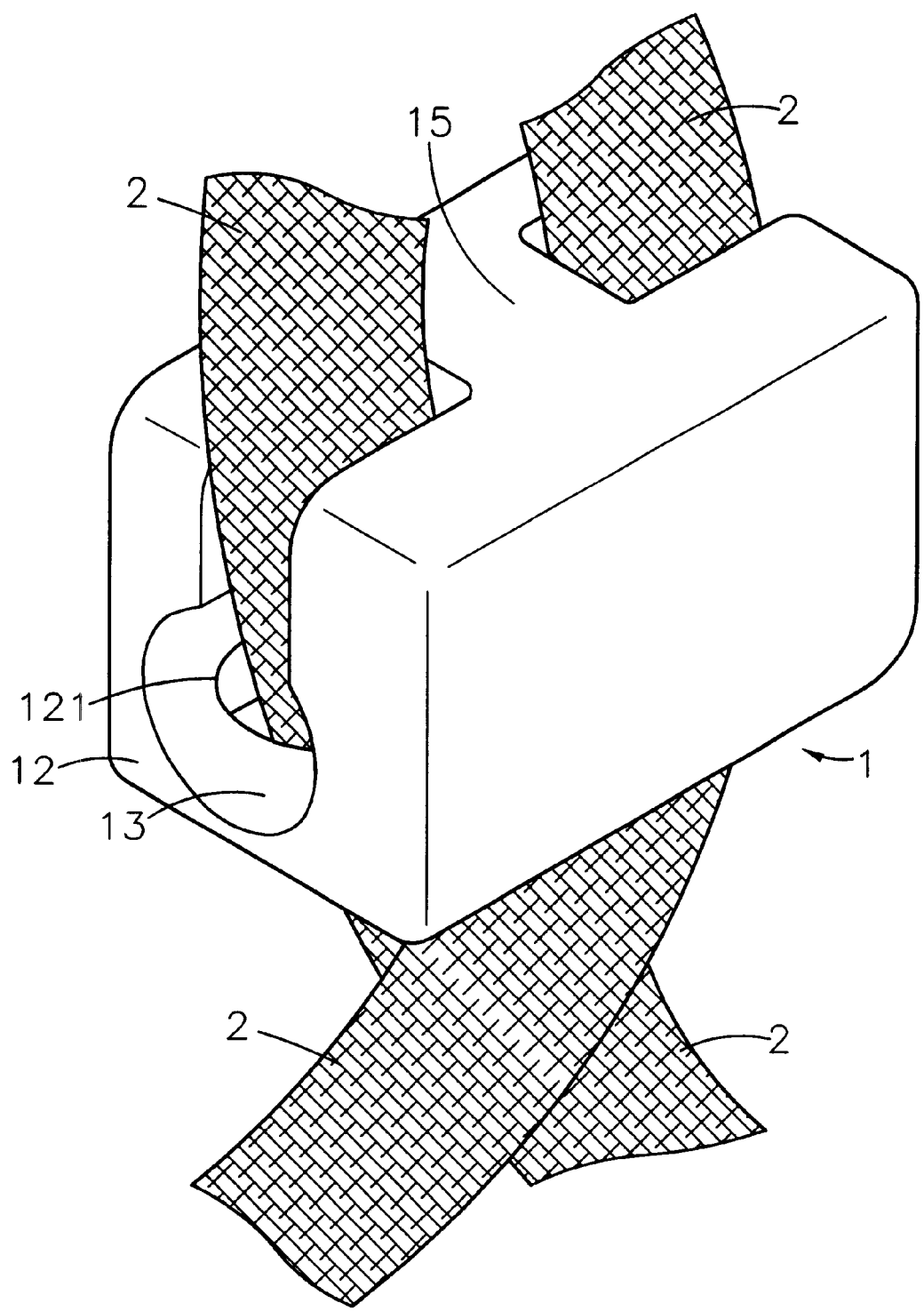
FIG. 6 is similar to FIG. 4 but showing the fabric straps moved to the engagement units.
Figure 8:
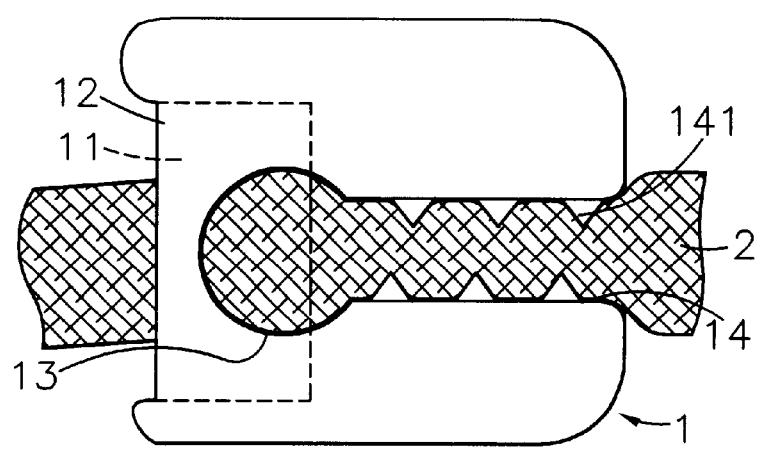
FIG. 8 is a side view of FIG. 7.

Referring to FIGS. 4 and 5, when in use, two fabric straps 2 are inserted through the insertion hole 11 so as to cross each other and respectively extend out of the release holes 13. At this time, the fabric straps 2 can be moved relative to the fabric strap retainer 1 and adjusted to the desired length.

Referring to FIGS. from 6 through 8, when fastening up the fabric straps 2, the fabric straps 2 are respectively twisted and turned from the release holes 13 to the engagement units 14 toward the side walls 151 of the partition column 15 while twisting. When twisted and moved to the side walls 151 of the partition column 15, the fabric straps 2 are deformed, and positively secured to the engagement units 14 by the teeth 141. At this time, the deformed fabric straps 2 are respectively stopped on the back turns 152, and prohibited from axial movement relative to the fabric strap retainer 1.

Figure 9:
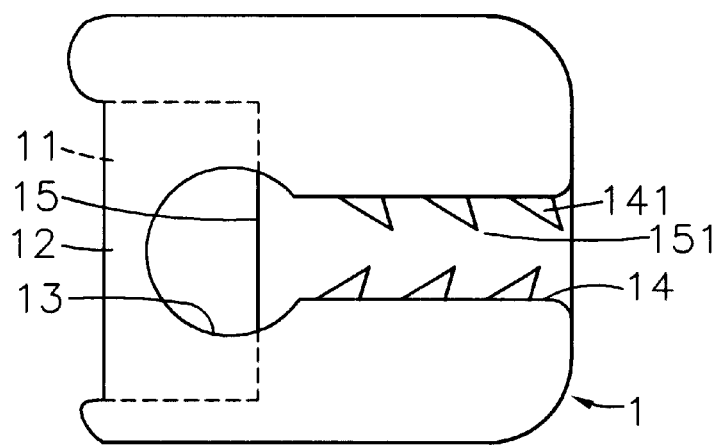
FIG. 9 is a side view of an alternate form of the present invention.

In the aforesaid embodiment, the teeth 141 of the engagement unit 14 are shaped like a triangular prism. In an alternate form of the present invention, the teeth 141 can be made sloping in one direction (see FIG. 9) that enable the twisted fabric straps to be moved forward but prohibit the twisted fabric straps from backward movement.

Figure 10:
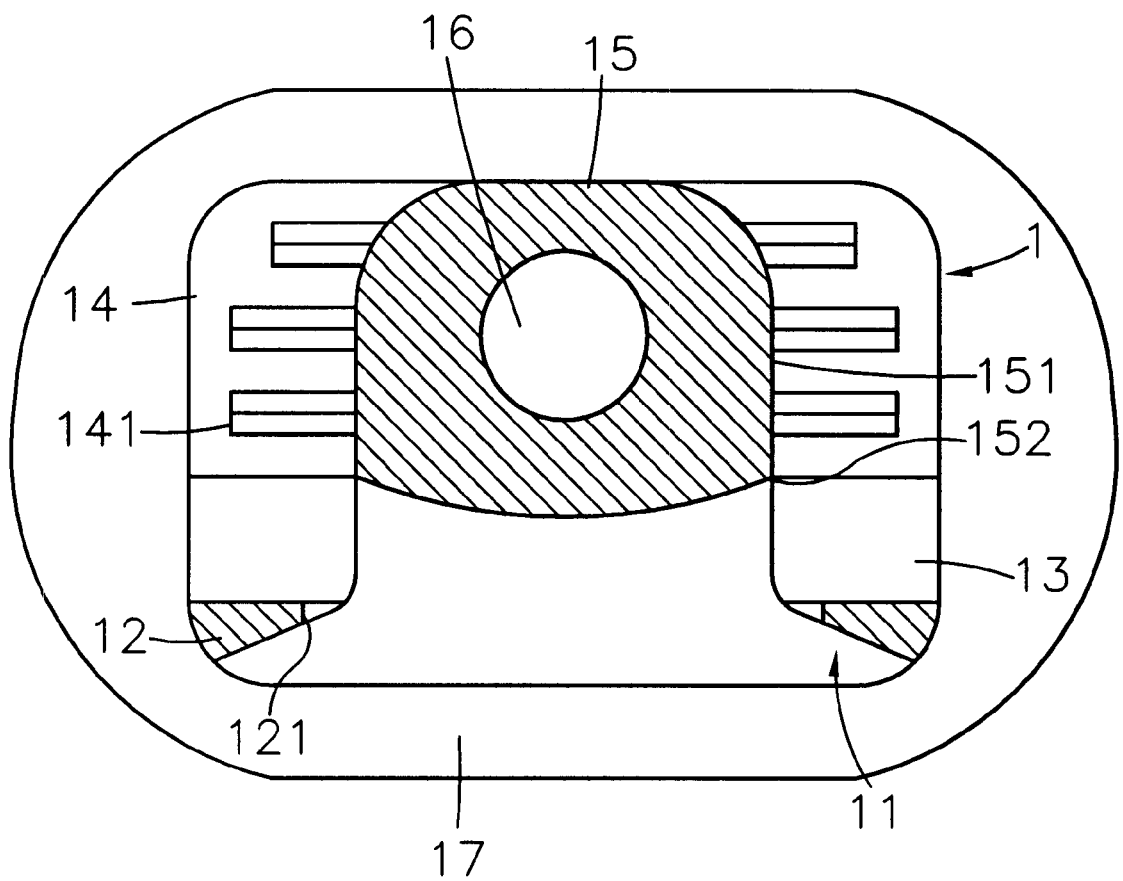
FIG. 10 is a top view in section of an alternate form of the present invention.

The locating hole 16 of the partition column 15 is adapted for mounting, enabling the fabric strap retainer 1 to be fastened to a shoe, back, or any of a variety of personal articles. In the alternate form shown in FIG. 10, the fabric strap retainer 1 has a peripheral flange 17 adapted for fastening the retainer 1 to an article by stitching.

Figure 11:
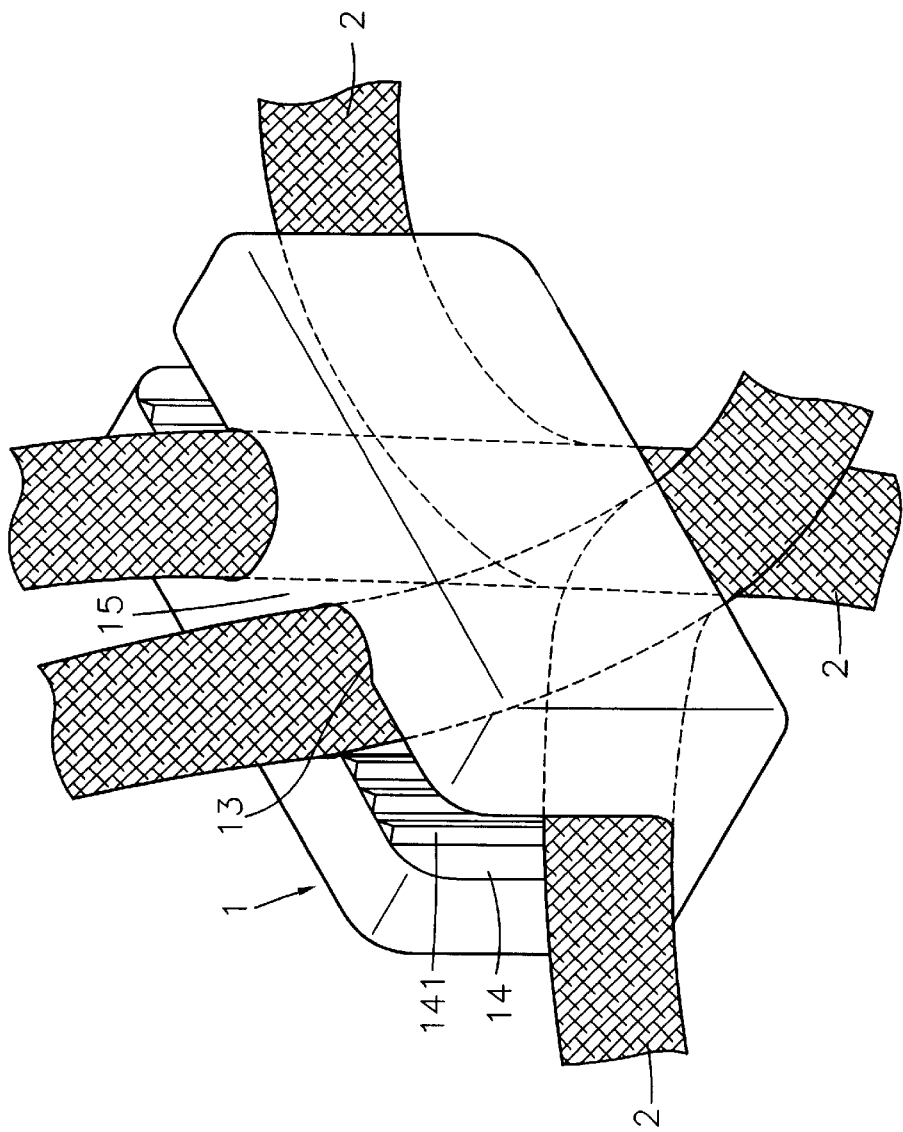
FIG. 11 is an applied view of another alternate form of the present invention.
Figure 12:
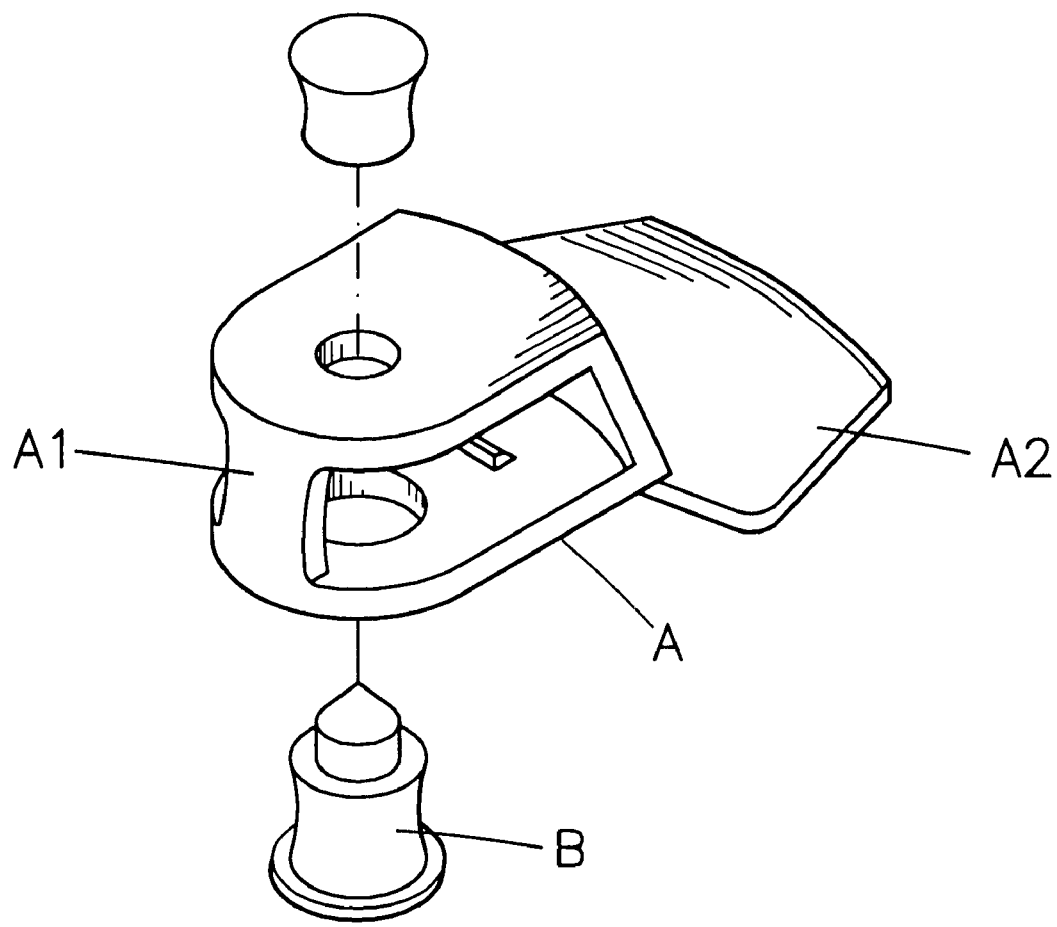
FIG. 12 is an exploded view of a cord member guide block according to the Taiwan Patent Publication No. 279324.
Figure 13:
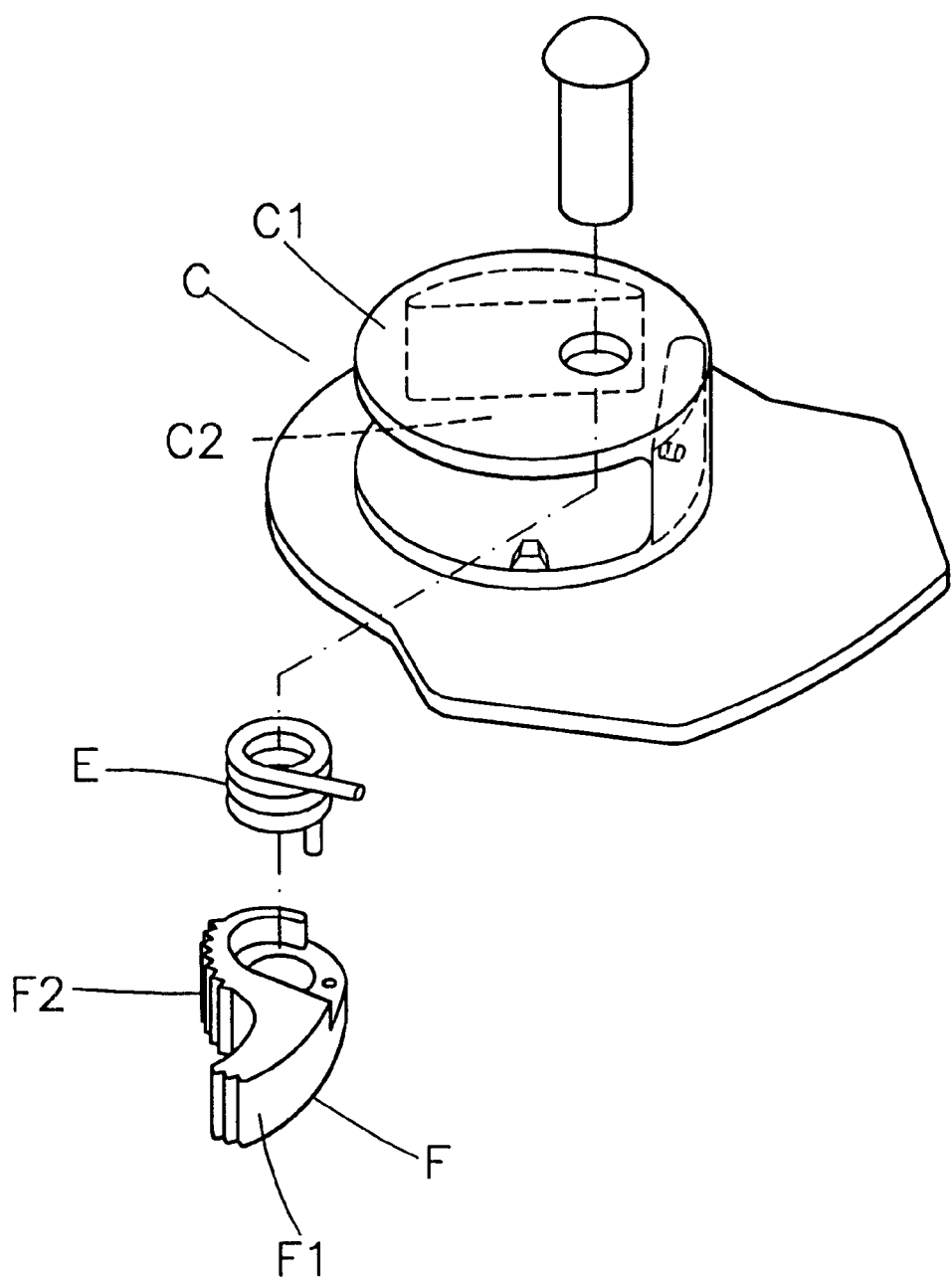
FIG. 13 is an exploded view of another structure of fabric cord member (strap) retainer according to Taiwan Patent Publication No. 369821.

FIG. 11 shows still another alternate form of the present invention. According to this alternate form, the release holes 13 are respectively disposed in communication between the sidewalls of the partition column 15 and the engagement units 14.

As indicated above, because the fabric strap retainer 1 is injection-molded from plastics, its manufacturing cost is low. By twisting and turning the crossed fabric straps 2 from the release holes 13 to the engagement units 14, the fabric straps 2 are locked. Repeating the procedure reversely causes the fabric straps 2 to be unlocked.

It is to be understood that the drawings are designed for purposes of illustration only, and are not intended as a definition of the limits and scope of the invention disclosed. For example, the hollow engagement units 14 can be made having no teeth, defining an engagement space of width gradually reduced in one direction toward the outside.

What the invention claimed is:

1. A fabric strap retainer, comprising:
   a back insertion hole disposed at a back side of the retainer for the insertion of two fabric straps;
   two post-like stop ends at two sides of the back insertion hole;
   a partition column disposed in a middle of the retainer, and flush with a front side of the retainer;
   two release holes respectively extending from the back insertion hole to a periphery of the retainer at two sides of the partition column; and
   two hollow engagement units respectively forwardly extending from the release holes to the periphery of the retainer at the two sides of the partition column, each hollow engagement unit having two series of teeth respectively disposed at top and bottom sides thereof, wherein said two post-like stop ends each have an arched bearing face adapted to support fabric straps inserted into said back insertion hole.

2. The fabric strap retainer of claim 1, wherein each release hole is disposed between a respective lateral side of said partition column and a respective engagement unit.

3. The fabric strap retainer of claim 1, wherein each engagement unit is disposed between a respective lateral side of said partition column and a respective release hole.

4. The fabric strap retainer of claim 1, wherein each of said engagement units has a width that is relatively smaller than a diameter of said release holes.

5. The fabric strap retainer of claim 1, wherein each of the teeth of said hollow engagement units is shaped like a triangular prism extending in a direction across a moving direction of the fabric straps being inserted through said back insertion hole.

6. A fabric strap retainer, comprising:
   a back insertion hole disposed at a back side of the retainer for the insertion of two fabric straps;
   two post-like stop ends at two sides of the back insertion hole;
   a partition column disposed in a middle of the retainer, and flush with a front side of the retainer;
   two release holes respectively extending from the back insertion hole to a periphery of the retainer at two sides of the partition column; and
   two hollow engagement units respectively forwardly extending from the release holes to the periphery of the retainer at the two sides of the partition column, each hollow engagement unit having two series of teeth respectively disposed at top and bottom sides thereof, wherein said partition column has a back locating hole adapted for mounting.

7. The fabric strap retainer of claim 6, wherein each of said engagement units has a width that is relatively smaller than a diameter of said release holes.

8. The fabric strap retainer of claim 6, wherein each of the teeth of said hollow engagement units is shaped like a triangular prism extending in a direction across a moving direction of the fabric straps being inserted through said back insertion hole.

9. The fabric strap retainer of claim 6,
   wherein each release hole is disposed between a respective lateral side of said partition column and a respective engagement unit.

10. The fabric strap retainer of claim 6, wherein each engagement unit is disposed between a respective lateral side of said partition column and a respective release hole.

11. A fabric strap retainer, comprising:
    back insertion hole disposed at a back side of the retainer for the insertion of two fabric straps;
    two post-like stop ends at two sides of the back insertion hole;
    a partition column disposed in a middle of the retainer, and flush with a front side of the retainer;
    two release holes respectively extending from the back insertion hole to a periphery of the retainer at two sides of the partition column;
    two hollow engagement units respectively forwardly extending from the release holes to the periphery of the retainer at the two sides of the partition column, each hollow engagement unit having two series of teeth respectively disposed at top and bottom sides thereof; and
    a mounting flange raised around the periphery of the retainer for mounting.

12. The fabric strap retainer of claim 11, wherein each of the teeth of said hollow engagement units is shaped like a triangular prism extending in a direction across a moving direction of the fabric straps being inserted through said back insertion hole.

13. The fabric strap retainer of claim 11,
    wherein each release hole is disposed between a respective lateral side of said partition column and a respective engagement unit.

14. The fabric strap retainer of claim 11, wherein each engagement unit is disposed between a respective lateral side of said partition column and a respective release hole.

15. The fabric strap retainer of claim 11, wherein each of said engagement units has a width that is relatively smaller than a diameter of said release holes.

* * * * *